United States Patent
Chuang

(10) Patent No.: US 6,934,560 B2
(45) Date of Patent: Aug. 23, 2005

(54) SYSTEM COMBINING PAGER TYPE PERSONAL DIGITAL ASSISTANT AND MOBILE PHONE MODULE

(75) Inventor: Ching-Lang Chuang, Taipei (TW)

(73) Assignee: TelePaq Technology Inc., Taipei (TW)

( * ) Notice: Subject to any disclaimer, the term of this patent is extended or adjusted under 35 U.S.C. 154(b) by 626 days.

(21) Appl. No.: 09/987,070

(22) Filed: Nov. 13, 2001

(65) Prior Publication Data

US 2003/0092466 A1 May 15, 2003

(51) Int. Cl.[7] .............................................. H04M 1/00
(52) U.S. Cl. ............................ 455/556.1; 455/550.1; 455/552.1; 455/553.1
(58) Field of Search ..................... 455/556.1, 556.2, 455/550.1, 552.1, 553.1, 557

(56) References Cited

U.S. PATENT DOCUMENTS

| | | | | |
|---|---|---|---|---|
| 5,983,073 A | * | 11/1999 | Ditzik | 455/11.1 |
| 6,164,531 A | * | 12/2000 | Harris et al. | 235/380 |
| 6,389,278 B1 | * | 5/2002 | Singh | 455/414.3 |
| 6,397,078 B1 | * | 5/2002 | Kim | 455/556.2 |
| 6,522,242 B1 | * | 2/2003 | Barrus et al. | 340/7.1 |
| 6,542,721 B2 | * | 4/2003 | Boesen | 1/1 |
| 6,745,046 B1 | * | 6/2004 | Eckert et al. | 455/552.1 |
| 6,782,242 B1 | * | 8/2004 | Koleda et al. | 455/90.3 |

* cited by examiner

*Primary Examiner*—Binh Tieu
*Assistant Examiner*—Tuan Pham
(74) *Attorney, Agent, or Firm*—Troxell Law Office, PLLC

(57) ABSTRACT

A system combining a pager type personal digital assistant and a mobile phone module and the method of the same are disclose. The system has a pager for real-time receiving data from a broadcasting system in a whole day; A personal digital assistant unit serves for displaying received data and making a selection responsive to the received data. A GSM/DCS integrating circuit serves to control operations of components of a mobile phone. A communication interface has two frequency channels for bidirectionally transmitting speech and data signals and then transmitting signals through GSM or DCS channels. Thereby, data and speech can be transferred bidirectionally through three channels; and data propagation can be realized in time.

13 Claims, 4 Drawing Sheets

SYSTEM COMBINING PAGER TYPE PERSONAL DIGITAL ASSISTANT AND MOBILE PHONE MODULE

1. Field of the Invention

The present invention relates to a system combining a pager type personal digital assistant and a mobile phone module, wherein a pager type personal digital assistant and a mobile phone module are integrated as an integral device. Users operate the system at any time and place; data and speech can be transferred bidirectionally through three channels; and data propagation can be realized in time.

2. Background of the Invention

Currently, stocks and futures are important tools in financial management. However, not everyone has time to a stock or future office for transaction. Therefore, many electronic products are developed, thereby, the subscribers monitor the prices of the stocks and futures through the screens of these electronic products.

Referring to FIG. 1, a conventional pager display flow diagram for displaying texts and numbers are illustrated. A pager 13 showing the prices of stocks is developed. In a data servo 11, the broadcasting data is transferred all day long to a paging system transmitting state 12. Then the data is sent to the subscribers through a wireless paging system. Therefore, the subscribers may know the prices of stocks through the display. Since the screen of the pager is too small so that only a few texts are displayed. Therefore, the efficiency is low.

Referring to FIG. 2, another conventional personal digital assistant connected with a mobile phone for transmitting data bidirectionally is illustrated. The personal digital assistant with a larger liquid crystal display is connected to a wireless pager system. Thereby, the subscriber may acquire data about stocks. Then a transmission line is used to connect the mobile phone for performing stock transaction. The structure includes a data servo 21. Data can be transferred to the mobile phone of the subscribers through a transmitting station 22 or a GSM/DCS base station 24 and then the mobile phone is further connected to a pager type personal digital assistant 23. However, this device is not convenient. If the mobile phone is updated, then the whole transmission device must be updated. Furthermore, if user forgets to carry a mobile phone or the battery of the mobile is exhausted, then the user can not transact. Furthermore, the total space of the mobile phone and the personal digital assistant is larger and thus it is inconvenient.

SUMMARY OF THE INVENTION

Accordingly, the primary object of the present invention is to provide a system combining a pager type personal digital assistant and a mobile phone module, wherein a pager type personal digital assistant and a mobile phone module are integrated as an integral device. Therefore, a space occupied is reduced and the integrated device is portable. Users operate the system at any time and place; data and speech can be transferred bidirectionally through three channels; and data propagation can be realized in time.

Another object of the present invention is to provide a system combining a pager type personal digital assistant and a mobile phone module wherein a speaker emits a voice promise to inform the user a message being received. The contents are displayed on a liquid crystal display real time. Therefore, the subscriber may receive data all day long.

A further object of the present invention is to provide a system combining a pager type personal digital assistant and a mobile phone module, wherein the personal digital assistant includes an infrared port, a key platform, a liquid crystal display, a memory, and a security device.

Another object of the present invention is to provide a system combining a pager type personal digital assistant and a mobile phone module, wherein the mobile phone includes a memory, a subscriber identity module, a speaker/microphone, a hand free receiver and a subscriber identity module. Data is sent by a wireless application protocol as a standard of bidirectional data transmission. The speech transmission function of the mobile phone can be used in the stock transaction.

The various objects and advantages of the present invention will be more readily understood from the following detailed description when read in conjunction with the appended drawing.

DETAILED DESCRIPTION OF THE PREFERRED EMBODIMENTS

The present invention is a combined system of a pager type personal digital assistant and a mobile phone module. In the present invention, a pager type personal digital assistant and a mobile phone nodule are integrated as an integral device. Therefore, the space can be reduced and the integrated device is portable. As a result, users may operate the present invention at any time and place. Data and speech can be transferred bidirectionally. The data propagation can be realized in time.

Figure 1:
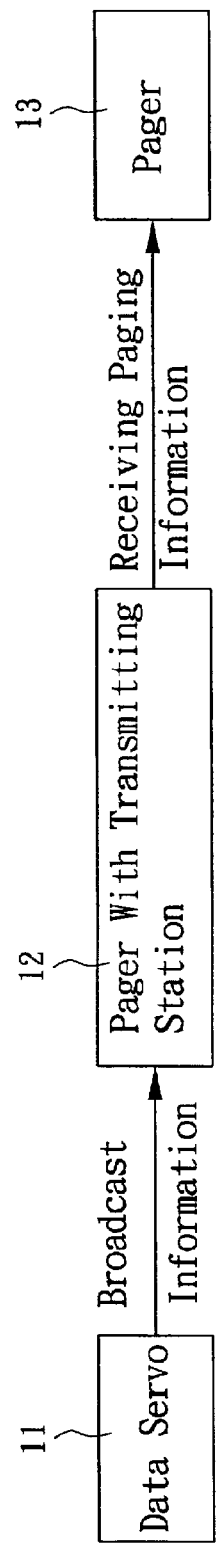
FIG. 1 is an operational flow diagram about the transmission and receiving process of a conventional paging system.
Figure 2:
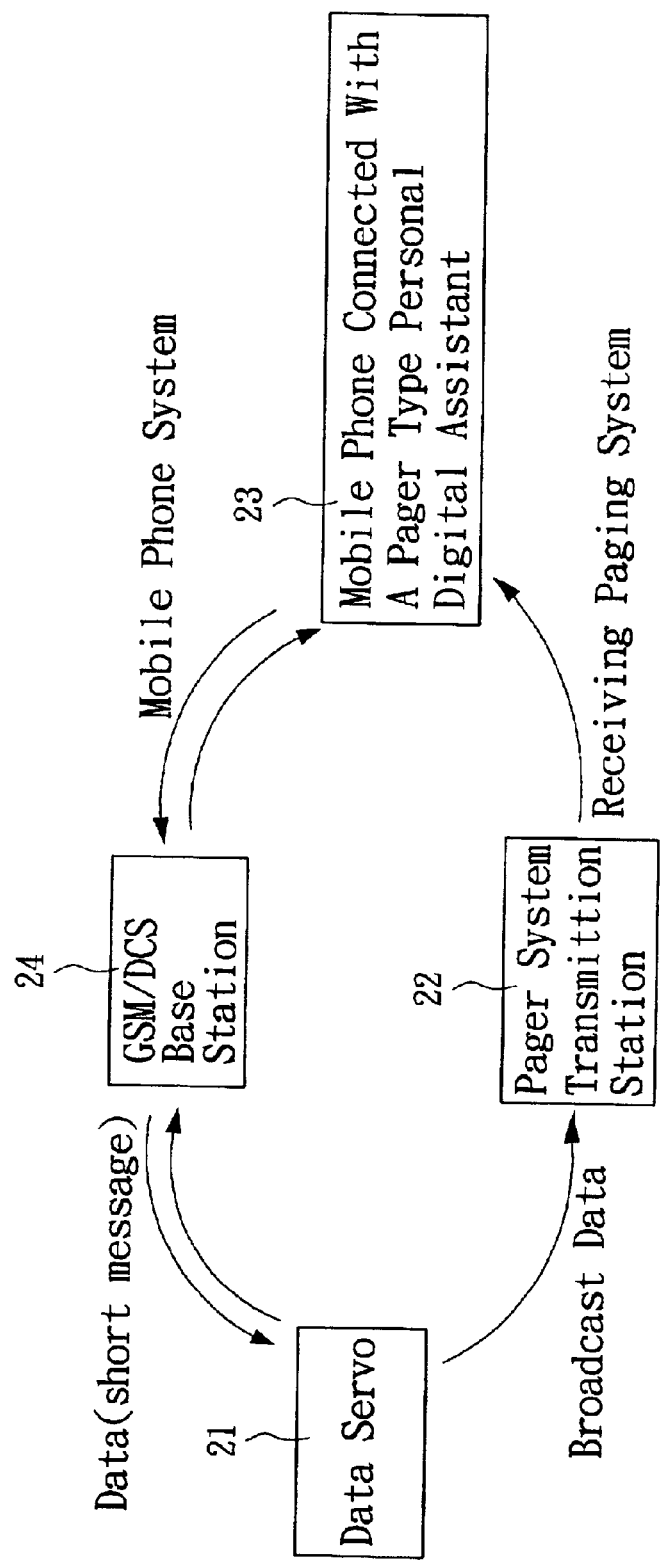
FIG. 2 shows an operational flow diagram of a prior art structure wherein a personal digital assistant is combined with a mobile phone.
Figure 3:
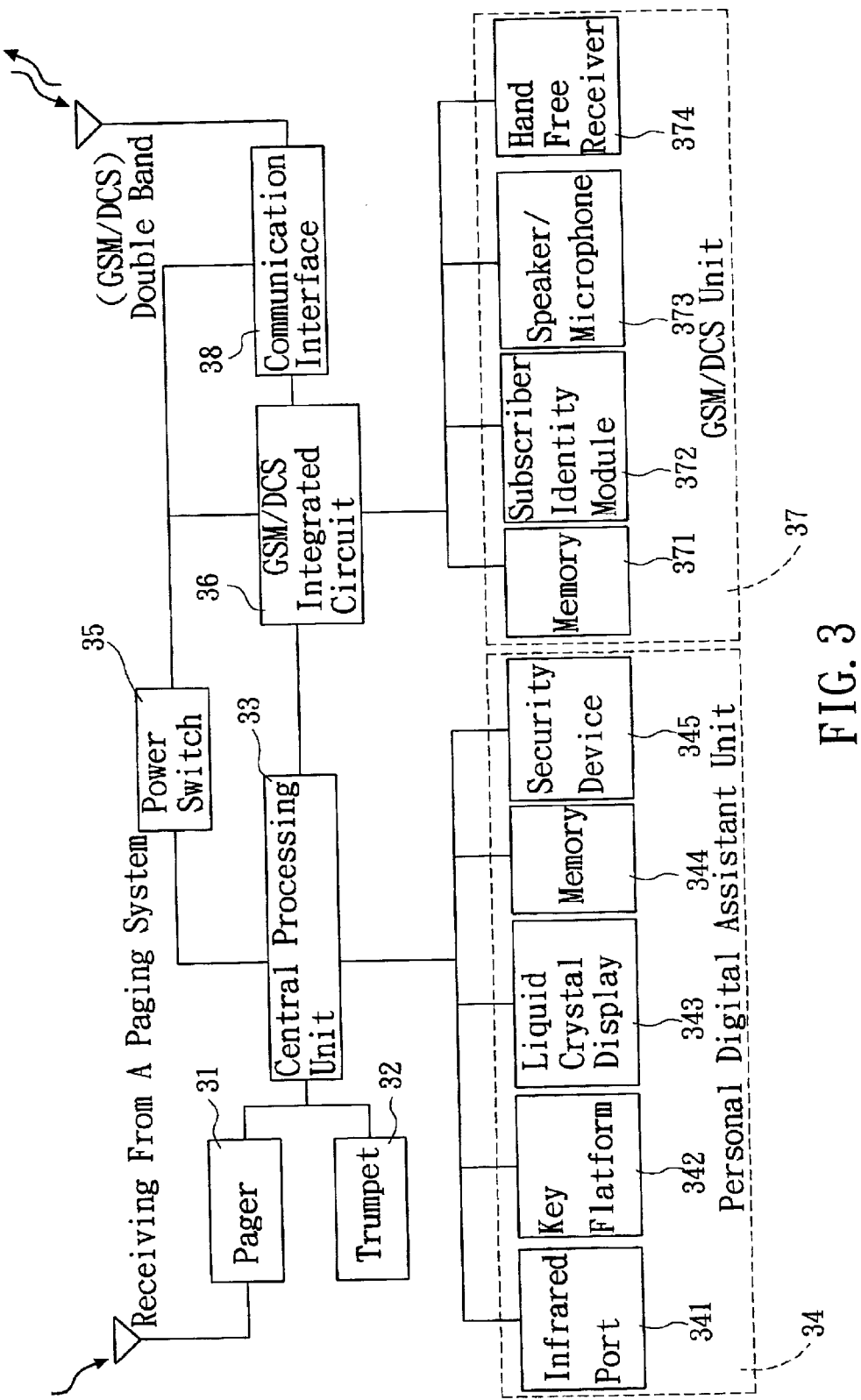
FIG. 3 is a block schematic view showing the structure of the present invention.

Referring to FIG. 3, a schematic view shows the structural block view of the present invention. The system provider emits a whole day real-time broadcast information through a pager system. The information is received by a built-in pager 31 of the present invention. Then a speaker or trumpet 32 emits a voice promise to inform the user a message being received, it is continuously transferred to a central processing unit 33 for being processing. The central processing unit 33 may operate and process each unit of a personal digital assistant unit 34. This personal digital assistant unit 34 is formed by the following components: an infrared port 341, a key platform 342, a liquid crystal display 343, a memory 344, and a security device 345, and other units. The mechanism of each component will be described in the following:

(1) An infrared port 341: The infrared port 341 may perform data transformation with other electronic device with another infrared port in a certain distance, thereby, transmission line being unnecessary.

(2) A key platform 342: The key platform 342 includes a plurality of directional keys for controlling the cursor in the frame to move upwards, downwards, leftwards, and rightwards. An input key is used to perform the function of choice, or an electrostatic sensing pen is used to control a cursor and perform a clicking operation.

(3) A liquid crystal display 343: The liquid crystal display 343 is installed in a proper position on a surface of the personal digital assistant 34 for displaying all information to the user.

(4) A memory 344: The memory 344 stores all data, thereby, user may read all received data.

(5) A security device 345: The security device 345 is a protecting circuit for preventing from an improper operation to damage a personal digital assistant 34.

The pager 31 is combined with the personal digital assistant unit 34 so as to be formed as a proper pager type personal digital assistant. However, the novelty of the present invention is that a mobile phone structure is added to the combined structure. At first, a power switch 35 is installed at a selected position in the personal digital assistant unit 34 for switching a mobile phone system. A GSM/DCS integrated circuit 36 is built—in the present invention for controlling the structural system 37 for processing a mobile phone. The mobile phone system controlled comprises the following components:

1. A memory 371: The memory 371 is dedicated to the mobile phone system for storing telephone numbers, text short messages, and other data for a short time period.

2. A subscriber identity module 372: The subscriber identity module 372 is installed within the mobile phone system and is a metal chip set recording with the number of the mobile phone, the system provider of the mobile phone; programs for actuating the mobile phone, and other related data, and memory space.

3. A speaker/microphone 373: The speaker is installed in the receiver of a mobile phone for propagating the system provider from the mobile phone base station. Furthermore, the microphone is installed at the voice emitting end of the mobile phone. The received audio signal is analog/digital—converted so that the system provider is emitted to the mobile phone base station from the mobile phone.

4. A hand free receiver 374: The hand free receiver 374 is inserted to an audio connecting port of the personal digital assistant unit 34 and has an outlook like an earphone. A microphone is installed below the receiver (speaker). When the user is busy, or is desired to prevent electromagnetic interference, This device is effectively in the bidirectional communication of speech signal.

Above components are connected to a GSM/DCS integrated circuit 36 for controlling and processing speech signal. The speech signal is sent to a communication interface 38 at the same time. The structure includes the following components: an analog/digital converting circuit, a digital/analog converting circuit, a GSM/DCS channel selecting circuit, an antenna etc. The communication interface has the functions of transmitting and receiving speech signals. The mobile phone system of the present invention is a GSM/DCS dual—frequency system, which has two frequency channels for bidirectionally transmitting speech and data signals. In that, data is sent by a wireless application protocol (WAP) as a standard of bidirectional data transmission.

Figure 4:
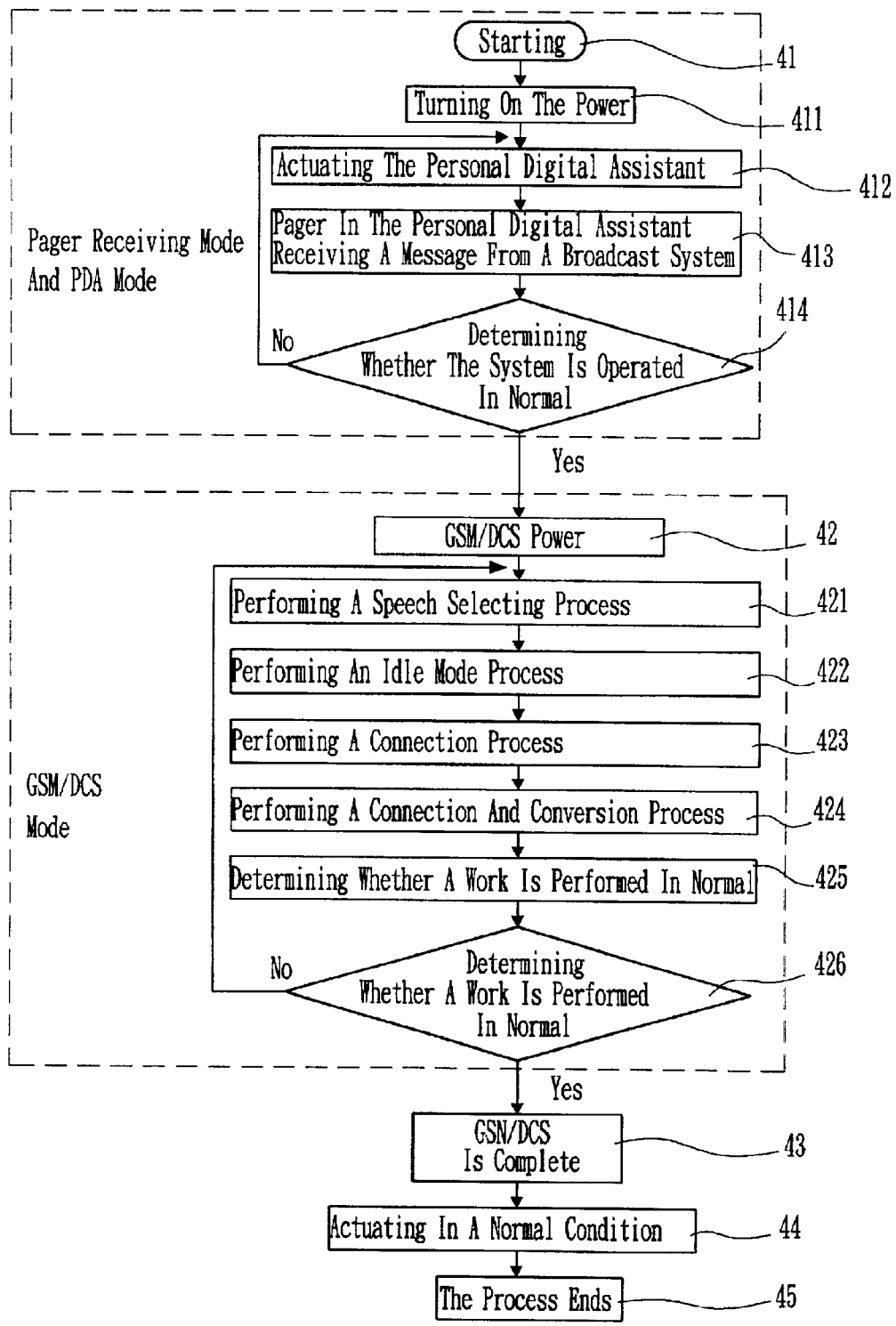
FIG. 4 is a flow diagram showing the operation of the present invention.

Referring to FIG. 4, an operational flow diagram of the present invention is illustrated. The process of pager receiving mode and personal digital assistant mode comprises the steps of starting (step 41); turning on the power (step 411); actuating the personal digital assistant (step 412); pager in the personal digital assistant receiving a message from a broadcast system (step 413); determining whether the system is operated in normal (step 414); if not, returning the process back to (step 412); if yes, actuating the GSM/DCS power (step 42); performing a speech selecting process (step 421); performing an idle mode process (step 422); performing a connection process (step 423); performing a connection and conversion process (step 424) and a continuous releasing process (425); determining whether the work is performed in normal (step 426); if no, the process returning to (step 421) and processes 421 to 425 are repeated; if yes, the GSM/DCS is complete (step 43); actuating in normal condition (step 44); and then end ending the process in (step 45).

The present invention utilizes three channels. As the present invention is used in the transmission of data and speech, the receiving and transmitting of the channels can be performed perfectly. The frequency channels of the present invention is:

1. Paging system: A frequency band of 285~1375 MHz is used in unidirectional for propagating unidirectionally, then, the signal is received by the built-in pager of the present invention in time.

2. GSM system: A transmitting frequency band GSM system is 880~915 MHz and a receiving frequency thereof is 925~960 MHz for bidirectionally broadcasting and receiving data and speech signals.

3. DCS system: A transmitting frequency band DCS system is 1710~1785 MHz and a receiving frequency thereof is 1805~1880 MHz for bidirectionally broadcasting and receiving data and speech signals.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for a system combining a pager type personal digital assistant and a mobile phone module comprising the steps of:

starting (step 41);

turning on the power (step 411);

actuating a personal digital assistant (step 412);

pager in the personal digital assistant receiving a message from a broadcast system (step 413);

determining whether the system is operated in normal (step 414);

if not, returning the process back to step 412; if yes, actuating the GSM/DCS power (step 42);

performing a speech selecting process (step 421);

performing an idle mode process (step 422);

performing a connection process (step 423);

performing a connection and conversion profess (step 424) and a continuous releasing process (425);

determining whether the work is performed in normal (step 426);

if no, the process returning to (step 421); if yes, the GSM/DCS is accomplished (step 43); and actuating a normal condition (step 44);

ending (step 45).

2. A communication system comprising:

a) a pager having a pager receiving frequency channel and receiving data from a broadcasting system;

b) a personal data assistant unit connected to the central processing unit and displaying data received from the central processing unit;

c) a GSM/DCS mobile phone unit;

d) a central processing unit connected to and controlling the pager, the personal data assistant unit, and the GSM/DOS mobile phone unit;

e) a communication interface having GSM and DOS frequency channels for bidirectionally transmitting speech and data signals bidirectionally through two channels; and f) a GSM/DCS integrating circuit connected to the pager, the personal data assistant unit, the central processing unit, the GSM/DCS mobile phone unit, and the communication interface, wherein data and speech are transferred through three channels.

3. The communication system according to claim 2, further comprising a speaker connected to the central processing unit.

4. The communication system according to claim 2, wherein the personal data assistant unit includes an infrared port, a key platform, a liquid crystal display, a memory, and a security device.

5. The communication system according to claim 4, wherein the key platform includes a plurality of directional keys, an input key, and an electronic sensing pen.

6. The communication system according to claim 2, wherein the GSM/DCS mobile phone unit includes a memory, a subscriber identification module, a speaker and a microphone, and a hand free receiver.

7. The communication system according to claim 6, wherein the subscriber identification module is a metal chip card storing a phone number of the mobile phone, a program controlling the mobile phone, and a memory.

8. The communication system according to claim 2, wherein the communication interface includes an analog to digital converting circuit, a digital to analog converting circuit, a GSM/DCS channel selecting circuit, and an antenna.

9. The communication system according to claim 2, further comprising a power switch controlling power to the GSM/DCS mobile phone unit.

10. The communication system according to claim 2, wherein the pager receiving frequency channel is between 285 and 1375 MHz.

11. The communication system according to claim 2, wherein the GSM frequency channel has a transmitting frequency between 880 and 915 MHz and a receiving frequency between 925 and 960 MHz.

12. The communication system according to claim 2, wherein the DCS frequency channel has a transmitting frequency between 1710 and 1785 MHz and a receiving frequency between 1805 and 1880 MHz.

13. The communication system according to claim 2, wherein the communication interface utilizes a wireless application protocol for bidirectionally transmitting the speech and data signals.

* * * * *